E. R. CALTHROP.
PARACHUTE.
APPLICATION FILED MAR. 27, 1917.

1,263,372.

Patented Apr. 23, 1918.
2 SHEETS—SHEET 1.

Everard Richard Calthrop
INVENTOR
By [signature]
Attorney

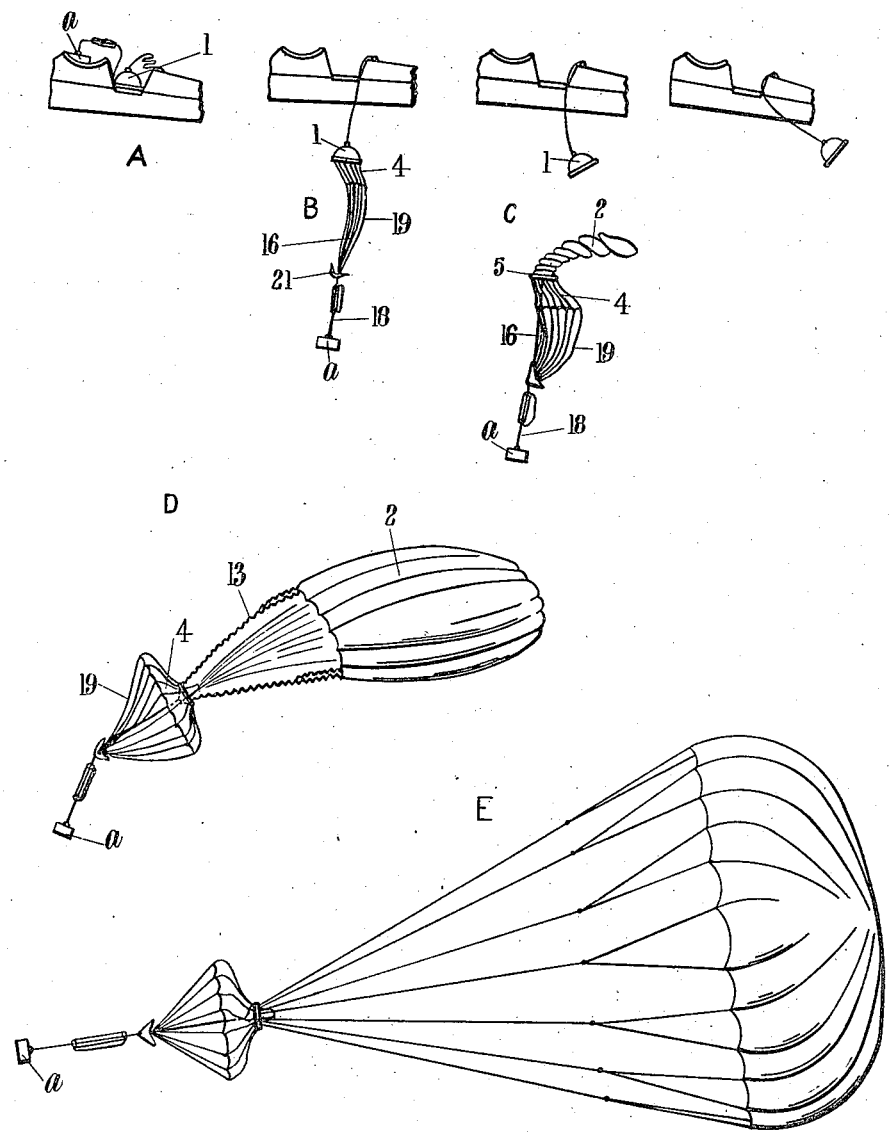

UNITED STATES PATENT OFFICE.

EVERARD RICHARD CALTHROP, OF LONDON, ENGLAND.

PARACHUTE.

1,263,372.

Specification of Letters Patent.  Patented Apr. 23, 1918.

Application filed March 27, 1917. Serial No. 157,854.

*To all whom it may concern:*

Be it known that I, EVERARD RICHARD CALTHROP, a subject of the King of Great Britain, residing at London, in the county of Middlesex, England, have invented new and useful Improvements Relating to Parachutes, of which the following is a specification.

My invention has reference to parachutes and parachute launching devices, of the kind in which the body of the parachute is normally retained in a compactly folded and plaited condition, and launched by the application of the load in such a manner as to secure its positive opening in all circumstances, such for example as is described in the specification of my prior application Serial No. 56635.

The objects of the present invention are, to provide an improved parachute and parachute launching device of the aforesaid kind which shall be rapidly and completely detached from the air craft when the load is applied without the danger of any part becoming entangled, irrespective of the position in which the aircraft may be traveling or moving, to insure that the parachute body may rapidly entrap the maximum amount of air to completely expand it and, generally, to improve the construction and operation of parachutes to the end of making them efficient and certain in operation.

In the accompanying drawings:

Fig. 2 is a series of diagrams designated A, B, C, D and E illustrating the successive stages of operation of the device and the expansion of the parachute when dropped from an aeroplane traveling at considerable speed.

Figure 1:
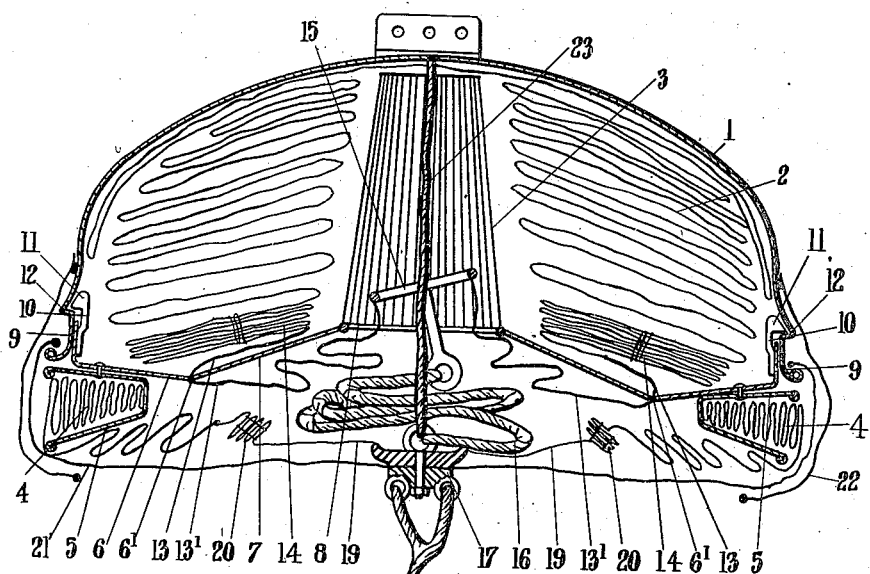
Figure 1 represents in vertical section, and more or less diagrammatically, a parachute launching device embodying this invention.

In that embodiment illustrated in Fig. 1 my improved device comprises a container or case 1, preferably of spun metal, adapted to hold the parachute body 2 which is compactly nested therein around a cage or support 3, preferably of skeleton formation being for instance constructed of wire or rods as shown. The cage 3 is attached to, and forms part of, a member for supporting the auxiliary parachute 4, said member being adapted for detachable connection with the container 1. Said member comprises an annular trough-shaped element 5 of spun metal, having an annular plate 6 positively secured thereto, such as by riveting or otherwise, the plate 6 being connected by wire spokes 7 to an annular member 8 on which the cage 3 is fixed. Said plate 6 is provided with an upstanding flange 9 carrying a plurality of spring fingers or pawls 10, the noses 11 of which are adapted to normally engage in recesses, or in a circumferential groove 12, formed in the container 1.

The body of the main parachute 2 is compactly folded and plaited within the container 1 around the cage or support 3, and the ends of the rigging—which is composed of tapes 13 arranged in packs 14 as described in my aforesaid prior specification—are secured to the plates 6 as at 6' for example, and other tapes or the like 13' connect the plate 6 with the ring or center piece 15, to which a rope 16, forming part of the main suspension, is attached. The opposite end of the rope 16 is connected to a member 17, to which is secured the rope 18, to which the aviator it attached by means of a suitable harness and shock absorber.

The auxiliary parachute 4 is provided with a central aperture at its apex, the annular edge of said aperture being firmly secured to the trough-shaped member 5, and the body of said parachute 4 compactly folded or nested within said member 5, as will be clearly understood from an inspection of Fig. 1. The tapes 19 constituting the rigging of the small parachute 4 are connected to the member 17, said tapes being also arranged in packs 20.

A lower, flexible, cover 21 of appropriate weather-proof material is secured to the member 17, and serves to close the bottom of the container, and to inclose and protect the operative parts of the device, and an outer, flexible, cover 22 is preferably arranged as shown to grip the container 1, and to provide a weather-proof joint where the lower cover 21 meets the container 1.

In order to hold the member 17 in normal position and prevent accidental displacement of the parts of the device, I prefer to provide an easily rupturable connection between said member and the container 1 and this may consist of a light cord or the like 23.

I will now proceed to describe the operation of my improved parachute launching device when used with an aeroplane traveling at speed, for which purpose reference should be had to the diagrams of Fig. 2.

Diagram A illustrates the device carried upon an aeroplane at the rear of the pilot's or passenger's seat, the container 1 being attached to the fuselage by a rope or the like, and the main suspension rope 18 being attached to the passenger which, in the diagrams, is represented by the weight a.

In case of emergency the passenger throws himself out of the aeroplane, and as the load is exerted on the main suspension rope 18 and member 17, the cover 21 will be first stripped away from the container 1 and the rigging 19 then extended, and as the weight is transferred through said rigging to the periphery of the auxiliary parachute 4, this latter will emerge from the trough 5, the folds being successively brought over the lower edge of the said trough 5 thereby entrapping a column of air. The positions of the parts at this moment are shown in diagram B.

Now as the application of the load continues to be exerted on the rope 16, this latter will become taut, and the whole weight will be exerted through the center-piece 15 and tapes 13' on the plate 6, with the result that this latter, together with member 5—to which the truncated apex of the auxiliary parachute is firmly secured—will be detached from the container 1 owing to the spring pawls or fingers 10 being disengaged by the pull of the load from the groove 12 in the container 1 and at this moment, as illustrated in diagram C, the main parachute 2 plaited and folded on the cage 3 will part from the container 1, the mouth of said parachute 2 being over the central aperture in the auxiliary parachute 4, so that the air collected and compressed by this latter issues from said aperture in a strong blast or current, which is thus directed to the interior of the parachute 2—see diagram D—and this blast of air, in conjunction with the outside air which enters the mouth of the parachute 2 as it falls, causes the parachute body to be rapidly and certainly expanded to its fullest extent, as illustrated in diagram E.

From numerous experiments conducted by me, I have demonstrated that the various positions shown in Fig. 2 are the actual positions assumed by the parachute during its expansion when launched from an aeroplane traveling at speed, as the resultant air pressure exerted on the parachute causes it to assume an approximately horizontal position when fully expanded, as in diagram E, and that thereafter it swings to and fro until it becomes vertical, and will thus land its load safely.

Figure 3:
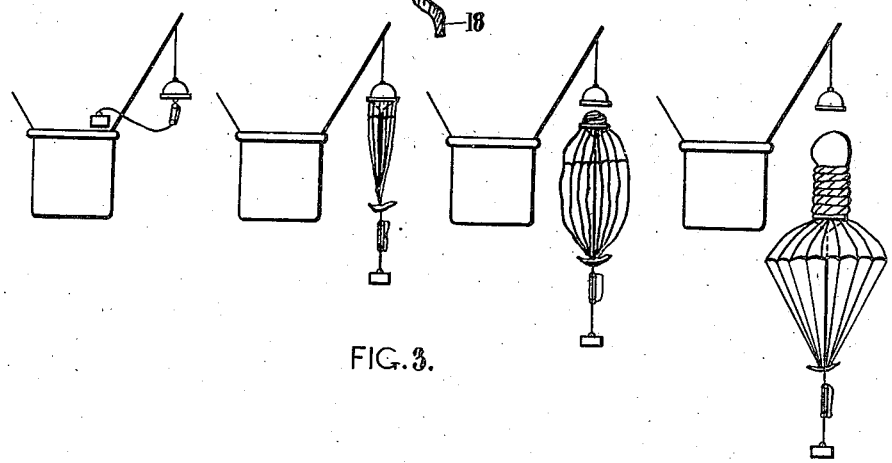
Fig. 3 is a similar series of diagrams illustrating the operation of the device when dropped from a balloon or similar aerial craft in still air.

The essential operation of the device when the parachute is launched from a balloon in still air is illustrated in the diagrams of Fig. 3, and is similar to that described with reference to Fig. 2 with the exception that the parachute at once drops vertically, there being no air current to cause it to swing.

The auxiliary parachute, in addition to fulfilling the functions hereinbefore referred to, also operates to minimize the swaying to and fro of the parachute and its passenger, and generally to steady the whole device during its descent to the ground.

I claim:

1. A main parachute and an auxiliary parachute both normally retained in a compactly folded and plaited condition within or on a container and adapted to be launched by the application of the load in such a manner that the auxiliary parachute is first expanded whereupon the main parachute is launched in a plaited and folded condition and the air entrapped by the auxiliary parachute compressed and conducted to the interior of said main parachute for the purpose specified.

2. A parachute launching device comprising a container for the main parachute a support for an auxiliary parachute having spring fingers or pawls adapted to detachably connect said support to the container, means whereby the weight of the load operates to detach said support from the container and abstract the main parachute therefrom.

3. A parachute launching device comprising a container for the main parachute and a support for an auxiliary parachute detachably connected thereto said support having a cage around which the main parachute is nested and means whereby the weight of the load operates to automatically detach said support and its associated parts from the container and launch the main parachute.

4. In a parachute launching device the combination of a container for receiving the main parachute in a compactly folded and plaited condition a support detachably connected to said container a trough shaped member on said support adapted to receive the auxiliary parachute also in a compactly folded and plaited condition a cage on said support about which the folded and plaited main parachute is arranged when packed a center piece connections or tapes between said center piece and the main parachute and the plate pertaining to the aforesaid support a member for the connections or tapes pertaining to the auxiliary parachute and a connection between said member and the center piece.

5. In a parachute launching device the combination of a container for the main parachute a support detachably connected to said container, a trough shaped member on said support for receiving the auxiliary parachute, a cage on said support a center piece connections or tapes between said center-piece and the main parachute and the aforesaid support a member for the connections or tapes pertaining to the auxiliary parachute a connection between said member and the center piece a readily rupturable connection between the aforesaid member and the container and spring fingers or pawls on the support for engaging with the container.

EVERARD RICHARD CALTHROP.